Feb. 7, 1933. S. G. HINDS 1,896,311
SEMIAUTOMATIC REMOTE CONTROL FOR AUTO DOORS
Filed April 20, 1931

Inventor
SIDNEY G. HINDS.
Jesse R. Stone.
Lester B. Clark
By
Attorneys.

Patented Feb. 7, 1933

1,896,311

UNITED STATES PATENT OFFICE

SYDNEY G. HINDS, OF HOUSTON, TEXAS

SEMIAUTOMATIC REMOTE CONTROL FOR AUTO DOORS

Application filed April 20, 1931. Serial No. 531,335.

The invention relates to an improvement in mechanism for operating automobile doors by manipulation of the mechanism from the driver's seat.

In sedans, limousines, and taxicabs, it is often desirable to have the driver operate the door from his position in the driver's seat, and with this in view one of the objects of the invention is to provide a mechanism which is simple and economical in its construction, and which will permit the driver to open and close the rear door of the automobile while he remains in his position in the driver's seat.

Another object of the invention is to provide a lever linkage which is adapted to cause opening and closing of the rear door by manipulation of the lever positioned adjacent the driver's seat.

Another object of the invention is to provide an automatic device for releasing the catch on the door which is to be operated, so that it may be opened by movement of a lever linkage.

A still further object of the invention is to provide a connection with the suction line of the automobile engine which will operate to open the latch of the door when desired.

Still another object of the invention is to provide a control handle adjacent the driver's seat whereby the latch on the door may be released and the door opened by movement of a single lever.

Other and further objects of the invention will be readily apparent, when the following description is considered in connection with the accompanying drawing, wherein.

Figure 1:
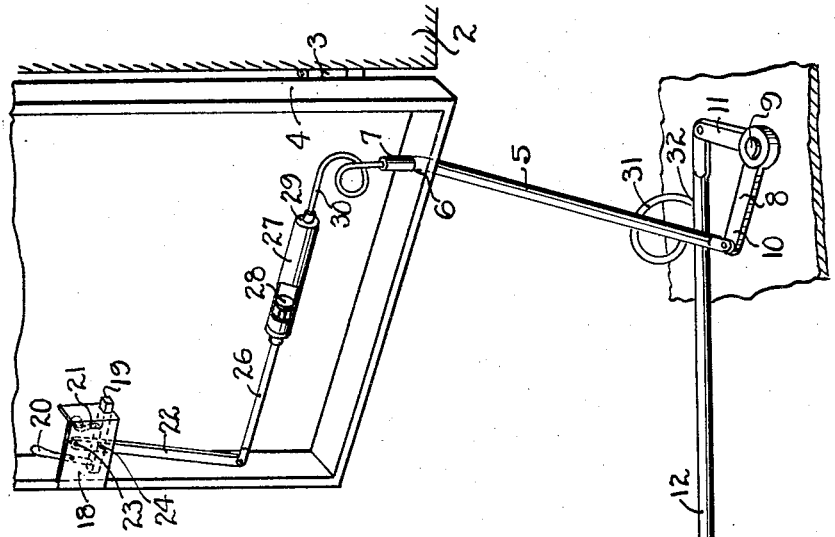
Fig. 1 is a diagrammatic layout of the door operating mechanism with certain parts in section and certain parts broken away for purpose of illustration.

By having reference to Fig. 1 the structure has been illustrated as being mounted on certain portions of the automobile body, these portions being shown as broken segments in order to simplify the drawing as it is believed that the construction and arrangement of automobile body structure is well known. The body or frame on which the door is mounted is illustrated at 2 and carries the hinges 3 which support the door 4. The door illustrated in the present drawing is the right-hand rear door of an automobile in which the steering mechanism is on the left hand side. It is to be understood that the device may be adapted for right hand drive cars, or may be arranged to operate either the left or the right rear door, or front door of the automobile.

In order that the door may be moved to open or closed position, an operative rod or bar 5 is positioned through an opening 6 in the base of the door, and projects upwardly to the inside of the door as at 7. This rod is connected to a bellcrank lever 8 which is pivoted at 9 to the body structure. This lever includes the arms 10 and 11 which are arranged at such an angle with respect to each other, that movement of one translates the movement of the other arm at substantially a right angle to the direction of the initial movement. The arm 11 receives the operative rod 12 which is pivoted at 13 to the handle 14 adjacent the driver's seat. This handle 14 may be pivoted or otherwise mounted to a bracket or support 15 carried by the floor board 16 or otherwise secured to any part of the automobile structure adjacent the driver's seat.

With this arrangement of the parts it seems apparent that the movement of the handle 14 backward or to the right from the position illustrated in Fig. 1 would cause inward or closing movement of the door 4 and movement in the opposite direction will cause opening of the door.

It is usual for automobile doors of the type here illustrated to be provided with a latch and one is therefore shown at 18. This latch is of standard type and includes the latch bolt 19 and the handle 20 for operating the same, as well as the locking pawl 21. When the latch is to be operated movement of the handle to the left retracts the bolt which releases the door. In order that this latch may be operated from the driver's seat a lever 22 is pivoted at 23 in a portion of the latch and is connected to the bolt 19 at the pin 24. Thus, movement of this lever will retract the bolt 19 and release the door in the same manner as movement of the handle 20.

It is necessary in operation of the device that the latch be released from a control at the driver's seat and for this purpose a piston rod 26 is connected to the lever 22 and extends into the cylinder 27. The piston 28 is carried by the piston rod and forms a seal on the inside of the cylinder. In event suction is applied to the end 29 of the cylinder it would cause the piston 28 to be drawn into the cylinder and compel an equivalent movement of the arm 22 to retract the bolt 19 and release the latch. It is understood that the cylinder 27 is rigidly mounted in the door structure.

Figure 2:
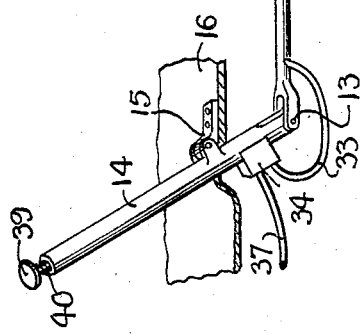
Fig. 2 is a broken sectional view through the lever construction for controlling the vacuum latch operative means.

In order to apply suction to the cylinder 27 a suction line 30 is connected thereto and leads into the end of the connecting rod 5 which may serve as a conduit for the suction to be applied to the cylinder. This conduit line is continued from the rod 5 by means of the connection 31 which in turn leads to the connecting rod 12 and may be fastened thereto as at 32. From the rod 12 the suction line continues as at 33 and leads to a valve or switch 34, and is seen in Fig. 2, and includes a slidable valve member 35 which contains a by-pass 36 which is arranged to connect the line 33 with the line 37 which leads to the vacuum or suction inlet of the engine. Operation of this valve 34 is caused by the plunger 39 which is slidable in the handle 14 and is normally maintained in a raised position by means of a spring 40. It is to be understood that the normal position of the valve 34 is to cut off the suction between the lines 33 and 37 and when it is desired to release the latch the plunger 39 will be depressed to form the connection as seen in Fig. 2. This allows the suction of the engine or inlet to be exerted through the line 33, the rod 12, the connection 31, the rod 5, and the connection 30 so that the suction is exerted on the piston 28 to release the latch.

When the rear door is to be opened it is only necessary for the driver to depress the plunger 39 so that the latch will be released and to thereafter move the handle 14 rearwardly to cause opening of the door. This is a material advantage as it is not necessary for the chauffeur to leave his seat to open the door, but he may manipulate the same while remaining in the car and the occupants of the car may obtain the same service as now had by the driver leaving his seat and passing around the car to open the door.

It is understood that various alterations and modifications may be made in the invention as regards the construction thereof, without departing from the spirit, as defined by the appended claims.

Having described my invention, what I claim is:

1. A device for operating automobile doors from the driver's seat including a lever, a linkage connected to said lever and to the door to be operated, a latch on the door, fluid pressure means carried by said lever and said linkage operable to release said latch, and a valve disposed in said lever to control said fluid pressure means.

2. In combination with an automobile a device for operating the rear door from the driver's seat including a lever linkage connected to said door to positively open or close the same, a fluid suction line carried by said linkage and connected to the latch on said door, and a control valve for said line operable with said lever linkage.

3. A device for operating motor vehicle doors including a lever linkage to move the door, a cylinder mounted in the door, a piston therein, means connecting said piston and the latch on said door, a suction line connected to said cylinder and passing through said linkage, and a control valve in said line to connect said cylinder with the suction of the vehicle motor to actuate said piston and release said latch.

In testimony whereof I hereunto affix my signature this 16th day of April A. D. 1931.

SYDNEY G. HINDS.